(12) United States Patent
Galindo et al.

(10) Patent No.: US 9,957,432 B2
(45) Date of Patent: May 1, 2018

(54) WELLBORE FLUID ADDITIVES OF FIBRILLATED FIBERS AND METHODS OF USE

(71) Applicant: Halliburton Energy Services, Inc., Houston, TX (US)

(72) Inventors: Kay A. Galindo, Houston, TX (US); Matthew Miller, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 36 days.

(21) Appl. No.: 15/022,467

(22) PCT Filed: Nov. 5, 2013

(86) PCT No.: PCT/US2013/068601
§ 371 (c)(1),
(2) Date: Mar. 16, 2016

(87) PCT Pub. No.: WO2015/069229
PCT Pub. Date: May 14, 2015

(65) Prior Publication Data
US 2016/0222275 A1   Aug. 4, 2016

(51) Int. Cl.
| | |
|---|---|
| C09K 8/516 | (2006.01) |
| C09K 8/035 | (2006.01) |
| E21B 43/25 | (2006.01) |
| C09K 8/03 | (2006.01) |
| C09K 8/40 | (2006.01) |

(Continued)

(52) U.S. Cl.
CPC ............... *C09K 8/035* (2013.01); *C09K 8/03* (2013.01); *C09K 8/40* (2013.01); *C09K 8/502* (2013.01); *C09K 8/516* (2013.01); *C09K 8/70* (2013.01); *C09K 8/76* (2013.01); *C09K 8/92* (2013.01); *E21B 21/003* (2013.01); *E21B 43/25* (2013.01); *C09K 8/528* (2013.01); *C09K 8/602* (2013.01); *C09K 8/605* (2013.01); *C09K 2208/08* (2013.01); *C09K 2208/12* (2013.01); *C09K 2208/22* (2013.01); *C09K 2208/26* (2013.01);

(Continued)

(58) Field of Classification Search
CPC ... E21B 21/003; C09K 2208/08; C09K 8/516; C09K 8/03
See application file for complete search history.

(56) References Cited

U.S. PATENT DOCUMENTS

| | | | |
|---|---|---|---|
| 5,439,055 A | 8/1995 | Card et al. | |
| 5,501,275 A | 3/1996 | Card et al. | |

(Continued)

FOREIGN PATENT DOCUMENTS

| | | |
|---|---|---|
| CN | 102803431 A | 11/2012 |
| EP | 2085447 A1 | 8/2009 |
| WO | 9318111 A1 | 9/1993 |

OTHER PUBLICATIONS

International Search Report and Written Opinion dated Aug. 18, 2014; International PCT Application No. PCT/US2013/068601.

*Primary Examiner* — Catherine Loikith
(74) *Attorney, Agent, or Firm* — McGuireWoods LLP

(57) ABSTRACT

A method of treating a portion of wellbore comprising introducing a treatment fluid into the portion of the wellbore. The treatment fluid comprises a base fluid and an additive comprising a plurality of fibrillated fibers. The amount of fibrillation is at least sufficient such that at least a portion of the fibrillated fibers form a fiber network in the base fluid.

20 Claims, 2 Drawing Sheets

(51) Int. Cl.
    *C09K 8/502*     (2006.01)
    *C09K 8/70*     (2006.01)
    *C09K 8/76*     (2006.01)
    *C09K 8/92*     (2006.01)
    *E21B 21/00*     (2006.01)
    *C09K 8/528*     (2006.01)
    *C09K 8/60*     (2006.01)

(52) U.S. Cl.
    CPC ...... *C09K 2208/28* (2013.01); *C09K 2208/32* (2013.01)

(56) References Cited

U.S. PATENT DOCUMENTS

| | | |
|---|---|---|
| 6,006,831 A | 12/1999 | Schlemmer et al. |
| 6,085,844 A * | 7/2000 | Palmer .................... E21B 37/00 166/312 |
| 6,164,380 A | 12/2000 | Davis |
| 6,172,011 B1 | 1/2001 | Card et al. |
| 6,419,019 B1 | 7/2002 | Palmer et al. |
| 7,753,123 B2 | 7/2010 | Fuller |
| 8,371,381 B2 | 2/2013 | Shindgikar et al. |
| 2009/0321142 A1 | 12/2009 | Dempsey et al. |
| 2010/0307747 A1 | 12/2010 | Shindgikar et al. |
| 2012/0285695 A1 | 11/2012 | Lafferty et al. |
| 2013/0000916 A1 | 1/2013 | Li |
| 2013/0118742 A1 | 5/2013 | Shindgikar et al. |
| 2014/0060841 A1* | 3/2014 | Morris .................... C09K 8/34 166/305.1 |
| 2014/0224507 A1* | 8/2014 | Fripp .................... E21B 33/12 166/376 |

* cited by examiner

… (1)

WELLBORE FLUID ADDITIVES OF FIBRILLATED FIBERS AND METHODS OF USE

TECHNICAL FIELD

Additives are commonly used in wellbore treatment fluids. Additives can include lost-circulation materials, fluid-loss control agents, sweeping agents, and suspending agents.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
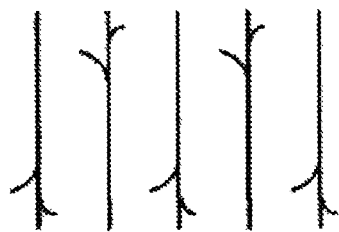
FIG. 1 depicts a fiber having a split fibril pattern.

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas, a heterogeneous fluid has more than one distinct phase. A suspension is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase. A heterogeneous fluid will have only one continuous phase, but can have more than one dispersed phase. It is to be understood that any of the phases of a heterogeneous fluid (e.g., a continuous or dispersed phase) can contain dissolved or undissolved substances or compounds. As used herein, the phrase "aqueous-based" means a solution wherein an aqueous liquid is the solvent or a colloid wherein an aqueous liquid is the continuous phase. As used herein, the phrase "oil-based" means a solution wherein a hydrocarbon liquid is the solvent or a colloid wherein a hydrocarbon liquid is the continuous phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wall of the wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The drilling fluid may be circulated downwardly through the drilling pipe, and back up the annulus between the wellbore and the outside of the drilling pipe. After the wellbore is formed using the drilling fluid, the well is "completed" in order to produce reservoir fluids into the wellbore. There are several completion operations that can be performed, such as perforating, fracturing, and sand control.

There are a variety of additives that can be added to a treatment fluid. Examples of common additives include lost-circulation materials, filtration control agents, sweeping agents, and suspending agents. During drilling or other operations such as completion, some of the base liquid of the treatment fluid can undesirably flow into the subterranean formation instead of remaining in the wellbore and being circulated back up to the wellhead. This is known as lost circulation. In order to overcome the problems associated with lost circulation, a lost-circulation material ("LCM") or a filtration control agent can be used. LCMs are generally non-swellable, granular-shaped substances. As the treatment fluid is placed into the well, the LCM can eliminate or lessen the amount of liquid base fluid entering the subterranean formation. For example, the particles of the LCM can build upon each other and form a bridge over highly-permeable areas of the formation, such as fissures or vugs. The bridge can eliminate or reduce the amount of liquid base fluid entering the formation via the wellbore.

A filtration control agent can form a filtercake on the wall of the wellbore. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes water, a gelling agent, calcium carbonate, and polymers, is introduced into the open-hole wellbore. The fluid flows into a desired portion of the well. The ingredients in the fluid form the filtercake during subsequent completion operations. The filtercake can be used to bind fines, such as sand, together, reduce damage to formation permeability, stabilize the wellbore, and reduce the amount of liquid that flows into the subterranean formation.

A sweeping agent can be used to sweep or remove debris from a wellbore. The sweeping agent can help increase the viscosity of the base fluid in order to help suspend the debris within the base fluid. The sweeping agent can also be a particulate that sweeps the debris into the fluid.

A suspending agent can be used to suspend insoluble additives or debris uniformly throughout the base fluid.

An additive can be biodegradable and/or biocompatible. Biocompatible means that the additive will not harm aquatic life. As used herein, an additive is considered "biodegradable" if the additive passes the OECD TG 306: Closed Bottle Seawater test. In accordance with Organisation for Economic Co-operation and Development (OECD) guidelines, an additive showing more than 20% biodegradability in 28 days according to the 306 test can be classified as primary biodegradable. An additive showing more than 60% biodegradability in 28 days (or if the additive is just below the 60% mark, then the test period can be extended by a few days) according to the 306 test can be classified as ultimate biodegradable, and it may be assumed that the additive will undergo rapid and ultimate degradation in a marine environment. An additive can be classified as primary or ultimate biodegradable if it passes the 306 test. Seawater generally contains the following major elements (by percentage): 85.84% oxygen; 10.82% hydrogen; 1.94% chlorine; 1.08% sodium; 0.13% magnesium; 0.09% sulfur; 0.04% calcium; 0.04% potassium; 0.007% bromine; and 0.003% carbon. The 306 test is performed as follows. A solution of the additive in seawater, usually at 2-5 milligrams per liter (mg/L), is inoculated with a relatively small number of microorganisms from a mixed population and kept in completely full, closed bottles in the dark at a constant temperature. Degradation is followed by analysis of dissolved oxygen over a 28 day period. The amount of oxygen taken up by the microbial population during biodegradation of the test polymer, corrected for uptake by the blank inoculum run in parallel, is expressed as a percentage of ThOD or, less satisfactorily COD.

There is a need for improved additives that can be used in a treatment fluid. It has been discovered that fibers can be fibrillated to allow the fibers to form a fiber network. The fibers can be used as a variety of additives for wellbore treatment fluids.

As used herein, the term "fiber" means a solid that is characterized by having a high aspect ratio of length to diameter. For example, a fiber can have an aspect ratio of length to diameter from greater than about 2:1 to about 5,000:1. As used herein, the term "fibrillated fibers" and all grammatical variations thereof means fibers bearing sliver-like fibrils along the length of the fiber. The fibrils extend from the fiber, often referred to as the "core fiber," and have a diameter significantly less that the core fiber from which the fibrils extend. Fibrillated fibers are commonly used in the papermaking industry and can be produced in a variety of ways, including a wet-spun water-dispersed form or a dry form. The fibrils can be in a split, barbed, or pulped pattern. Moreover, the amount of fibrils on a particular fiber is called the amount of fibrillation.

According to an embodiment, a treatment fluid comprises: a base fluid; and an additive, wherein the additive comprises a plurality of fibrillated fibers, and wherein the amount of fibrillation is at least sufficient such that at least a portion of the fibrillated fibers form a fiber network in the base fluid.

According to another embodiment, a method of treating a portion of wellbore comprises: introducing the treatment fluid into the portion of the wellbore.

The discussion of preferred embodiments regarding the treatment fluid or any ingredient in the treatment fluid, is intended to apply to all of the composition embodiments and method embodiments. Any reference to the unit "gallons" means U.S. gallons.

The treatment fluid includes a base fluid. The treatment fluid can be an aqueous-based fluid, an oil-based fluid, or a fluorous-based fluid. The treatment fluid can be a heterogeneous fluid, for example, a slurry or an emulsion or invert emulsion. Any of the phases of the heterogeneous fluid can contain dissolved substances and/or undissolved substances. The base fluid can be the liquid continuous phase of the heterogeneous fluid. The base fluid can be an aqueous liquid, an aqueous miscible liquid, a hydrocarbon liquid, or a fluorous liquid. Suitable aqueous-based fluids can include, but are not limited to, fresh water; saltwater (e.g., water containing one or more water-soluble salts dissolved therein); brine (e.g., saturated salt water); seawater; and any combination thereof. Suitable aqueous-miscible fluids can include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, magnesium chloride, potassium chloride, sodium bromide, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof.

The hydrocarbon liquid can be synthetic. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins-based drilling fluids include, ENCORE® drilling fluid and ACCOLADE® internal olefin and ester blend drilling fluid, marketed by Halliburton Energy Services, Inc. An example of a diesel oil-based drilling fluid is INVERMUL®, marketed by Halliburton Energy Services, Inc.

The treatment fluid includes an additive, wherein the additive comprises a plurality of fibrillated fibers. The additive can include non-fibrillated fibers or other ingredients. The additive can also consist essentially of, or consist of, the plurality of fibrillated fibers. The fibrillated fibers can be in dry form or in a liquid suspension. The fibrillated fibers can be natural, biopolymers, synthetic, biodegradable, and/or biocompatible. Examples of synthetic fibers include, but are not limited to, polymers composed of polypropylene, polyaramid, polyester, polyacrylic nitrile, and polyvinyl alcohol. Examples of biodegradable fibers include, but are not limited to, fibers composed of modified cellulose, chitosan, soya, modified chitosan, polycaprolactone, poly(3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of other suitable fibers include, fibers of cellulose including viscose cellulosic fibers, oil coated cellulosic fibers, and fibers derived from a plant product like paper fibers; carbon including carbon fibers; melt-processed inorganic fibers including basalt fibers, wollastonite fibers, non-amorphous metallic fibers, ceramic fibers, and glass fibers. There can also be a mixture of fibrillated fibers wherein the fibrillated fibers are composed of different substances. A commercially-available example of a suitable synthetic fibrillated fiber is CFF®, available from Sterling fibers in Pace, Fla. Commercially-available examples of a suitable biodegradable fibrillated fiber include CURLEX® or BINDEX™, available from American Excelsior Company in Arlington, Tex. The fibrillated fibers can also be fluorous fibrillated fibers. The fibrillated fibers can be partially or wholly fluorinated. The fibers can be fluorinated, for example, by replacing some or all of the hydrogen atoms with a fluorine atom. The number of hydrogen atoms that are replaced can be referred to as the amount or degree of fluorination. The fibrillated fibers can also be coated with a fluorous material. A commercially-available example of a suitable fluorous fibrillated fiber is TEFLON® fibers, available from Toray Fluorofibers, Inc. in Decatur, Ala.

Figure 2:
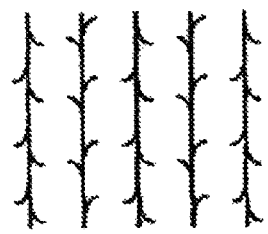
FIG. 2 depicts a fiber having a barbed fibril pattern.
Figure 3:
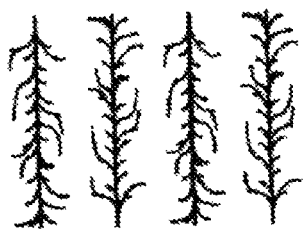
FIG. 3 depicts a fiber having a pulped fibril pattern.

The amount of fibrillation is at least sufficient such that at least a portion of the fibrillated fibers form a fiber network in the base fluid. As used herein, the term "fiber network" means a matrix of individual fibers that are interconnected and do not easily separate once interconnected. The fibrillated fibers can become interconnected, much like the cross-linking of a polymer, via the fibrils of the fibers. It should be understood that not all of the plurality of fibrillated fibers have to form the fiber network, nor do any non-fibrillated fibers have to form the fiber network. However, a sufficient amount of the fibers should form the fiber network for the additive to function for its intended purpose (e.g., as a LCM, filtration control agent, etc.). The amount of fibrillation can depend on the fibril pattern of the fibers. The fibrils can be in a split, barbed, or pulped pattern. FIG. 1 shows a split pattern, FIG. 2 shows a barbed pattern, and FIG. 3 shows a pulped pattern. The plurality of the fibrillated fibers can include combinations of the fibril pattern. For example, some of the fibrillated fibers can have a barbed fibril pattern while the other fibrillated fibers can have a pulped fibril pattern. The amount of fibrillation for a single fiber is as follows in descending order of amount of fibrillation: pulped, barbed, split. Therefore, a plurality of pulped fibers would necessarily have a higher amount of fibrillation compared to a plurality of split fibers. The length of the fibrils can also vary and can facilitate the formation of the fiber network. The length of the fibrils may also need to be longer for a split pattern versus a pulped pattern, for example, in order to allow the fiber network formation.

The core fibers can have a fiber length. The core fibers can have a distribution such that at least 90% of the fibers have a core fiber length in the range of about 50 micrometers ($\mu m$) to about 13,000 $\mu m$. The plurality of fibrillated fibers can have different core fiber lengths. Any non-fibrillated fibers can also have different fiber lengths or the same core length. The fiber length of any non-fibrillated fibers can be selected such that the non-fibrillated fibers become part of the fibrillated fiber network. According to another embodiment, the fibrillated fibers have a core fiber length such that at least the portion of the fibrillated fibers forms the fiber network. The core fiber length can vary based on the amount of fibrillation and can be inversely proportional to the amount of fibrillation. By way of example, pulped fibrillated fibers may form the fiber network with a core fiber length that is shorter than the core fiber length of split fibrillated fibers. Therefore, the core fiber length of the fibrillated fibers can be selected based on the fiber pattern. By way of example, the plurality of fibrillated fibers can include both barbed and pulped fibril patterns. The barbed fibers can have a core fiber length in the range of about 3,000 pm to about 6,000 $\mu m$; whereas, the pulped fibers could have a core fiber length of less than 3,000 $\mu m$.

The concentration of the fibrillated fibers can vary and can be selected such that the fiber network is formed. According to an embodiment, the fibrillated fibers are in a concentration in the range of about 0.1 to about 10 pounds per barrel "ppb" of the treatment fluid. The concentration, fiber length, and amount of fibrillation can be related and may be inversely proportional. For example, as the amount of fibrillation increases, the concentration and fiber length may be decreased and still allow the fibers to form the fiber network.

According to an embodiment, the additive is dispersible in the base fluid. The fibrillated fibers of the additive can further include a coating or other modification to enable the fibrillated fibers to disperse in the base fluid. By way of example, if the base fluid is a liquid hydrocarbon, then the fibrillated fibers can include a hydrophobic coating to allow the fibers to disperse in the liquid hydrocarbon.

The additive can be a lost-circulation material ("LCM"), a filtration control agent, a sweeping agent, or a suspending agent. According to an embodiment, the additive is an LCM, wherein the LCM inhibits or prevents some or all of the base fluid of the treatment fluid from penetrating into a subterranean formation, wherein the wellbore penetrates the subterranean formation. It should be understood that while some of the treatment fluid may penetrate into the subterranean formation, the majority of the treatment fluid should remain in the wellbore. Moreover, as used herein, the term "penetrate" and all grammatical variations thereof is not intended to preclude some penetration of a certain depth into the formation, for example, a few inches, but rather is meant to include penetration of depths into the formation that would be considered in the industry as lost circulation, and could likely impair oil or gas operations or increase the cost of performing the oil or gas operation. The additive can also be a filtration control agent. The filtration control agent can form a filtercake on a wellbore wall portion. According to the LCM and filtration control agent embodiments, the fiber network inhibits or prevents some or all of the base fluid from penetrating into the subterranean formation. Accordingly, the core fiber length may be around 3,000 μm.

The additive can be a sweeping agent. According to this embodiment, the fiber network helps to remove debris from the wellbore. The core fiber length for this embodiment may be around 6,000 μm. The fiber network formed for a sweeping agent may be less dense compared to the fiber network formed for an LCM or filtration control agent.

The additive can also be a suspending agent. For this embodiment, the fiber network suspends insoluble particulates uniformly throughout the base fluid and prevents the particulates from settling out of the base fluid. The suspending agent can help to increase the viscosity of the treatment fluid. The core fiber length for this embodiment may be around 1,000 μm. The fiber network may also be sufficiently dense based on the particle size of the particulates.

The treatment fluid can be any fluid used in an oil or gas operation where the additive may be useful. For example, the treatment fluid can be, without limitation, a drilling fluid, spacer fluid, completion fluid, fracturing fluid, acidizing fluid, packer fluid, or workover fluid.

The treatment fluid can also contain other ingredients, such as a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof. Of course, depending on the exact type of treatment fluid, the treatment fluid can include a variety of other ingredients not specifically mentioned here, but would be desirable to include in the fluid.

Suitable shale stabilizers can include, but are not limited to, long chain alcohols; polyols; polyglycols; amine inhibitor; sodium or potassium silicate; partially hydrolyzed polyacrylamides; polyalkene glycols; anionic surfactants; salt solutions containing, for example, sodium chloride, potassium chloride, or ammonium chloride; cationic polymers and oligomers, for example, poly(dimethyldiallylammonium chloride), cationic poly(acrylamide) and cationic poly (dimethylaminoethylmethacrylate); and any combination thereof. Examples of commercially-available shale stabilizers include CLAY SYNC™, CLAYSEAL® PLUS, PERFORMATROL®, GEM™ GP, GEM™ CP, BORE-HIB®, BARO-TROL® PLUS, EZ-MUD®, EZ-MUD® GOLD, and BARASIL™-S, marketed by Halliburton Energy Services, Inc. The shale stabilizer can be in a concentration in the range of about 0.1 to about 30 pounds per barrel "ppb" (about 0.4 to about 116 kilograms per cubic meter "kg/m$^3$") of the treatment fluid, preferably about 1 to about 15 ppb (about 4 to about 15 kg/m$^3$) of the treatment fluid.

The weighting agent can be any material capable of increasing the density of the treatment fluid. The weighting agent can additionally aid in controlling formation pressures and stabilizing the wellbore. Suitable weighting agents include, but are not limited to, barite; hematite; ilmentite; manganese tetraoxide; galena; calcium carbonate; iron oxide; galena; magnetite; siderite; celesite; and any combination thereof. Examples of a commercially-available weighting agents include, but are not limited to, BAROID®, BARODENSE®, MICROMAX™, and combinations thereof, marketed by Halliburton Energy Services, Inc. The weighting agent can be in a concentration in the range of about 1 to about 1,500 ppb (about 4 to about 5,800 kg/m$^3$) of the treatment fluid, preferably about 10 to about 700 ppb (about 39 to about 2,706 kg/m$^3$) of the treatment fluid. According to another embodiment, the weighting agent is in at least a sufficient concentration such that the treatment fluid has a density in the range of about 9 to about 20 pounds per gallon (ppg) (about 1.1 to about 2.4 kilograms per liter "kg/L"), preferably in the range of about 9 to about 18 ppg (about 1.1 to about 2.1 kg/L).

Suitable pH buffers can be any pH buffer capable of controlling the pH of the treatment fluid (e.g., increasing or decreasing the pH). The pH buffers can be included in the treatment fluid to enhance the stability of the treatment fluid, for example. Suitable pH buffers can include, but are not limited to: sodium carbonate; potassium carbonate; sodium bicarbonate; potassium bicarbonate; sodium diacetate; potassium diacetate; ammonium diacetate; sodium phosphate; potassium phosphate; sodium hydrogen phosphate; potassium hydrogen phosphate; sodium dihydrogen phosphate; potassium dihydrogen phosphate; sodium borate; magnesium oxide; sulfamic acid; sodium hydroxide; potassium hydroxide; citric acid; tartaric acid; and any combination thereof. The pH buffer can be in at least a sufficient concentration to maintain the pH of the treatment fluid at a desired level. According to another embodiment, the pH buffer is in a concentration in the range of about 0.01 to about 10 ppb (about 0.04 to about 39 kg/m$^3$) of the treatment fluid, preferably about 0.1 to about 2 ppb (about 0.4 to about 8 kg/m$^3$) of the treatment fluid.

The treatment fluid can also include a friction reducer. Commercially-available examples of a suitable friction reducers include, but are not limited to, BARO-LUBE GOLD SEAL™, TORQ-TRIM® II, graphitic carbon, and combinations thereof, marketed by Halliburton Energy Services, Inc. The friction reducer can be in a concentration of at least 0.5 ppb (2 kg/m$^3$) of the drilling fluid. In an embodiment, the friction reducer is in a concentration in the range of about 0.5 to about 5 ppb (about 2 to about 19 kg/m$^3$) of the drilling fluid.

According to an embodiment, the methods include the step of introducing the treatment fluid into a portion of the wellbore. There can also be more than one treatment fluid introduced into the wellbore, wherein each treatment fluid includes the fibrillated fiber additive. The well can be an oil, gas, or water production well, a geothermal well, or an injection well. The well includes the wellbore. The wellbore penetrates a subterranean formation. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The well can include an annulus. The step of introducing the treatment fluid can include introducing the treatment fluid into a portion of the annulus.

The methods can further include introducing a spacer fluid into the wellbore after the step of introducing the treatment fluid. The methods can also further include introducing a cement composition into the wellbore after the step of introducing the treatment fluid and/or the spacer fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion;

foam cementing; primary or secondary cementing operations; well-plugging; and gravel packing. The cement composition can be in a pumpable state before and during introduction into the wellbore. The step of introducing can include introducing the cement composition into a portion of an annulus. Of course there can also be more than one treatment fluid introduced into a portion of the wellbore. The treatment fluids can be the same or different, for example, one treatment fluid can be a drilling fluid and another treatment fluid can be a spacer fluid, so long as each treatment fluid contains at least the additive comprising the fibrillated fibers.

The method embodiments can also include allowing the cement composition to set. The step of allowing the cement composition to set can be performed after the step of introducing the cement composition into the wellbore. The method can further include perforating, fracturing, and/or performing an acidizing treatment after the step of allowing the cement composition to set.

Figure 4:
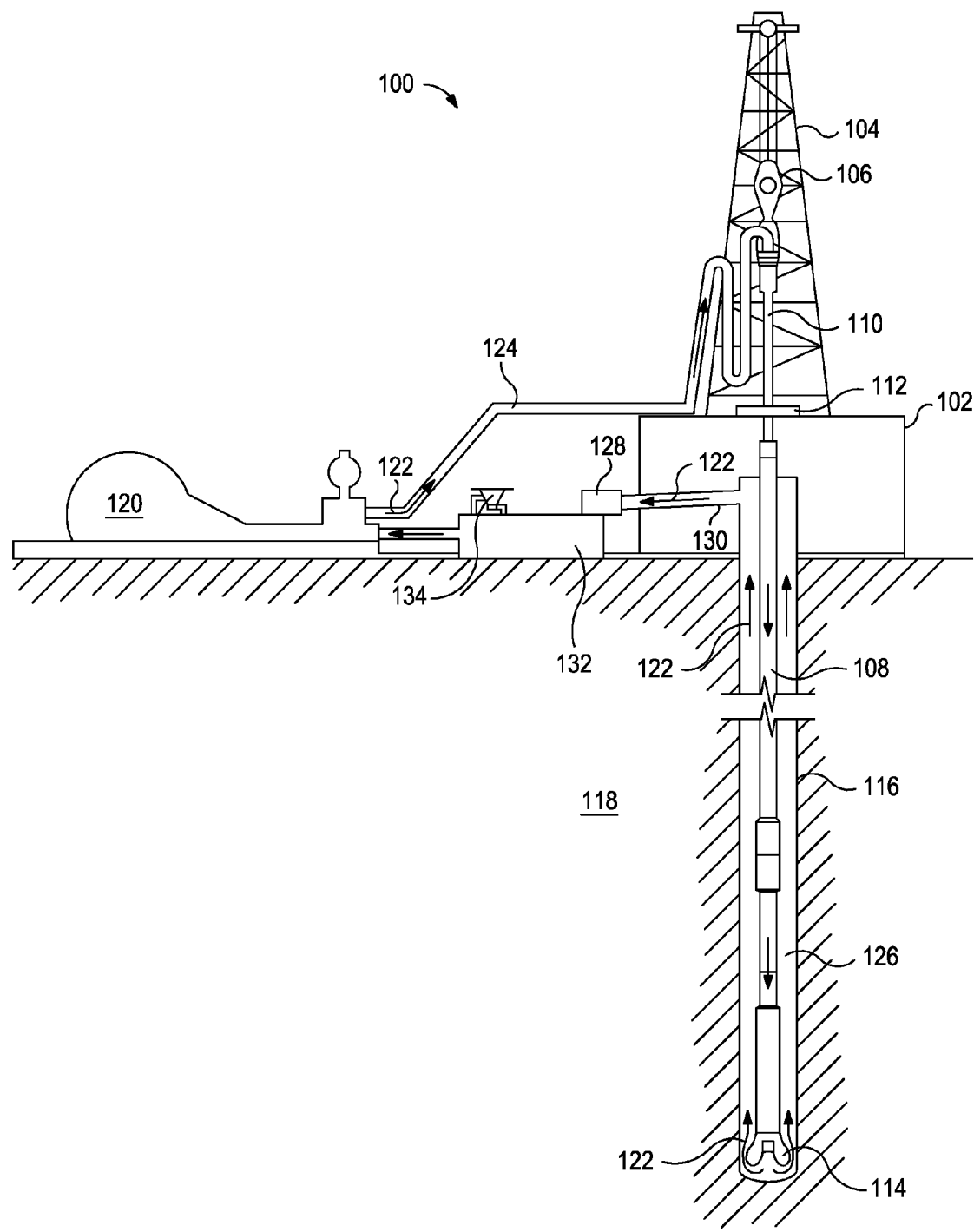
FIG. 4 depicts a drilling well system.

The exemplary fluids disclosed herein may directly or indirectly affect one or more components or pieces of equipment associated with the preparation, delivery, recapture, recycling, reuse, and/or disposal of the disclosed fluids. For example, and with reference to FIG. 4, the disclosed fluids may directly or indirectly affect one or more components or pieces of equipment associated with an exemplary wellbore drilling assembly 100, according to one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments; however, the disclosed fluids may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed fluids may be stored, reconditioned, and/or regulated until added to the drilling fluid 122.

As mentioned above, the disclosed fluids may directly or indirectly affect the components and equipment of the drilling assembly 100. For example, the disclosed fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used store, monitor, regulate, and/or recondition the exemplary fluids.

The disclosed fluids may directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids may also directly or indirectly affect the mixing hopper 134 and the retention pit 132 and their assorted variations.

The disclosed fluids may also directly or indirectly affect the various downhole equipment and tools that may come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids may also directly or indirectly affect any downhole heat exchangers, valves and corresponding actuation devices, tool seals, packers and other wellbore isolation devices or components, and the like associated with the wellbore 116. The disclosed fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed fluids may also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of wellbore comprising:
   introducing a treatment fluid into the portion of the wellbore, wherein the treatment fluid comprises:
   a base fluid; and
   an additive comprising a plurality of fibrillated fibers having a fibril pattern,
   selectively varying the fibril pattern and concentration of the fibrillated fibers by adding fibrillated fibers having different fibril patterns to the plurality of fibrillated fibers; wherein the fibrillated fibers comprise at least two fibril patterns selected from the group consisting of split pattern, barbed pattern, pulped pattern, and any combination thereof; and
   forming a fiber network in the base fluid.

2. The method according to claim 1, wherein the base fluid is selected from the group consisting of an aqueous liquid, a liquid hydrocarbon, a fluorous liquid, or combinations thereof.

3. The method according to claim 1, wherein the additive further comprises non-fibrillated fibers.

4. The method according to claim 1, wherein the fibrillated fibers are in dry form or in a liquid suspension.

5. The method according to claim 1, wherein the fibrillated fibers are biodegradable.

6. The method according to claim 1, wherein the fibrillated fibers are composed of substances selected from the group consisting of: polymers composed of polypropylene, polyaramid, polyester, polyacrylic nitrile, polyvinyl alcohol, polycaprolactone, polylactic acid, poly(3-hydroxybutyrate), polyhydroxy-alkanoates, polyglycolic acid, polyorthoesters, polycarbonates, polyaspartic acid, or polyphosphoesters; modified cellulose; chitosan; soya; modified chitosan; cellulose; viscose cellulose; oil-coated cellulose; carbon; basalt; wollastonite; non-amorphous metals or metal alloys; ceramics; glass, and combinations thereof.

7. The method according to claim 1, wherein the fibrillated fibers are partially or wholly fluorinated.

8. The method according to claim 1, wherein the fibrillated fibers have a core fiber length in the range of about 50 µm to about 13,000 µm.

9. The method according to claim 1, wherein the fibrillated fibers have a core fiber length such that at least the portion of the fibrillated fibers forms the fiber network.

10. The method according to claim 1, wherein the treatment fluid has a concentration of the fibrillated fibers, wherein the concentration of the fibrillated fibers is selected such that the fiber network is formed.

11. The method according to claim 1, wherein the additive is dispersible in the base fluid.

12. The method according to claim 11, wherein the fibrillated fibers comprise a coating or other modification to enable the fibrillated fibers to disperse in the base fluid.

13. The method according to claim 1, wherein the additive is a lost-circulation material, a filtration control agent, a sweeping agent, or a suspending agent.

14. The method according to claim 1, wherein the treatment fluid is a drilling fluid, spacer fluid, completion fluid, fracturing fluid, acidizing fluid, packer fluid, or workover fluid.

15. The method according to claim 1, wherein the treatment fluid further comprises one or more other ingredients.

16. The method according to claim 15, wherein the ingredients are selected from the group consisting of: a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

17. The method according to claim 16, wherein the weighting agent is in at least a sufficient concentration such that the treatment fluid has a density in the range of about 9 to about 20 pounds per gallon.

18. The method according to claim 1, wherein the wellbore is part of a well, and wherein the well is an oil, gas, or water production well, a geothermal well, or an injection well.

19. The method according to claim 1, wherein the treatment fluid is introduced into the wellbore via a pump and a drilling string.

20. A treatment fluid comprising:
    a base fluid; and
    an additive comprising a plurality of fibrillated fibers having an amount of fibrillation,
    wherein the fibrillated fibers comprise at least two fibril patterns selected from the group consisting of a split pattern, barbed pattern, pulped pattern, and any combination thereof;
    wherein the amount of fibrillation is at least sufficient such that at least a portion of the fibrillated fibers form a fiber network in the base fluid.

* * * * *